US00RE43556E

(19) United States
(12) Reissued Patent
Konno

(10) Patent Number: US RE43,556 E
(45) Date of Reissued Patent: Jul. 31, 2012

(54) IMAGE FORMING APPARATUS

(75) Inventor: Masaaki Konno, Kanagawa (JP)

(73) Assignee: Fujifilm Corporation, Tokyo (JP)

(21) Appl. No.: 11/970,864

(22) Filed: Jan. 8, 2008

Related U.S. Patent Documents

Reissue of:

(64) Patent No.: 7,097,279
Issued: Aug. 29, 2006
Appl. No.: 10/809,453
Filed: Mar. 26, 2004

(30) Foreign Application Priority Data

Mar. 28, 2003 (JP) ..... 2003-091292

(51) Int. Cl.
*B41J 2/205* (2006.01)
*B41J 2/21* (2006.01)

(52) U.S. Cl. ..... 347/15; 347/43; 347/102

(58) Field of Classification Search ..... 347/4, 12, 347/15, 40, 43, 102, 98, 100

See application file for complete search history.

(56) References Cited

U.S. PATENT DOCUMENTS 4,889,560 A 12/1989 Jaeger et al.
6,644,763 B1 * 11/2003 Gothait ..... 347/1
6,846,073 B2 * 1/2005 Yamamoto et al. ..... 347/102
7,717,551 B2 * 5/2010 Kadomatsu et al. ..... 347/102

FOREIGN PATENT DOCUMENTS

JP 4-74193 B 11/1992
JP 2000-318140 11/2000
JP 2001-150661 A 6/2001
JP 2001-225459 8/2001

OTHER PUBLICATIONS

Japanese Office Action with partial translation dated Mar. 6, 2007.

* cited by examiner

*Primary Examiner* — Lamson Nguyen
(74) *Attorney, Agent, or Firm* — Whitham, Curtis, Christofferson & Cook, P.C.

(57) ABSTRACT

The image forming apparatus includes a first ink-jet recording head which forms a first layer having first undulations in accordance with an image to be recorded, a second ink-jet recording head which performs image recording of the image to be recorded and a third ink-jet recording head which forms a second layer having second undulations that are also in accordance with the image to be recorded [but larger than] *such that* the first undulations of the first layer that is to be formed by the first ink-jet recording head *are large and the second undulations are fine or smaller in comparison therewith.*

4 Claims, 2 Drawing Sheets

IMAGE FORMING APPARATUS

Matter enclosed in heavy brackets [ ] appears in the original patent but forms no part of this reissue specification; matter printed in italics indicates the additions made by reissue.

BACKGROUND OF THE INVENTION

This invention relates to the art of image forming by ink-jet recording. More particularly, the invention relates to an image forming apparatus capable of forming an image that represents a satisfactory three-dimensional effect by producing undulations in accordance with the design of the original picture.

Providing images with a three-dimensional effect by producing undulations in accordance with the design of the original picture is one of the current practices in the printing industry. A way to implement this printing approach is by overlaying image prints on one image-receiving sheet through ink-jet recording.

For example, JP 2000-318140 A discloses a method in which a page image divided into a plurality of planes is acquired from a host computer and the individual plane images are formed in superposition as solid ink layers on the same image-receiving sheet (medium) by means of an ink-jet printer, whereby undulations are formed to produce an image having a three-dimensional effect.

JP 2001-225459 A discloses a method of forming an image with an ink-jet printer, characterized in that normal printing with normal ink employing a normal ink printing head and expanded ink printing with transparent expandable ink employing an expandable ink printing head are performed in superposition, thereby creating an image with a three-dimensional effect.

However, according to the method disclosed in JP 2000-318140 A, one and the same ink-jet head is employed throughout the printing cycle, so the images formed in the respective planes are of the same height and undulations that are reasonably faithful to the three-dimensional effect of the real world cannot be formed with high degree of freedom. In addition, image formation is quite time-consuming since undulations are formed by repeating the image recording process with the same ink-jet head.

On the other hand, according to the method disclosed in JP 2001-225459 A, the image per se is recorded by a normal ink-jet system and undulations are formed by the expandable ink; therefore, a greater three-dimensional effect can be expressed and still only a short time is required to form the image.

However, the method disclosed in JP 2000-318140 A and other conventional ink-jet based methods of forming an image having undulations are not capable of representing other features than the three-dimensional effect, such as the texture of constituent elements of the original picture.

SUMMARY OF THE INVENTION

The present invention has been accomplished under those circumstances and has as an object providing an ink jet based image forming apparatus that can form hard copies of high quality that not only represent the three-dimensional effect of the real world by forming large undulations in accordance with the design of the original picture but also reproduce faithfully its texture such as the gloss or non-glossiness of its constituent elements by forming fine undulations, with the added advantage that this can be realized with high efficiency and rapidity.

In order to attain the object described above, the present invention provides an image forming apparatus includes a first ink jet recording head which forms a first layer having first undulations in accordance with an image to be recorded, a second ink-jet recording head which performs image recording of the image to be recorded and a third ink-jet recording head which forms a second layer having second undulations that are also in accordance with the image to be recorded [but larger than] the first undulations of the first layer that is to be formed by the first ink-jet recording head *are large and the second undulations are fine or small in comparison with said first undulations*.

In this image forming apparatus, it is preferable that the first ink-jet recording head is such that a liquid resin having a viscosity of 1 mPa·s to 30 mPa·s within the first ink-jet recording head is ejected as droplets in a volume of 50 pl to 200 pl by the first ink jet recording head, and the third ink-jet recording head is such that a liquid resin having a viscosity of 1 mPa·s to 30 mPa·s within the third ink-jet recording head is ejected as droplets in a volume of 5 pl to 80 pl by the third ink-jet recording head.

It is further preferable that the first ink-jet recording head forms the first layer in which differences among undulations are no more than 2 mm and the third ink-jet recording head forms the second layer in which differences among undulations are no more than 100 μm.

DESCRIPTION OF THE PREFERRED EMBODIMENT

The image forming apparatus of the invention is described in detail with reference to the preferred embodiment illustrated in the accompanying drawings.

Figure 1A:
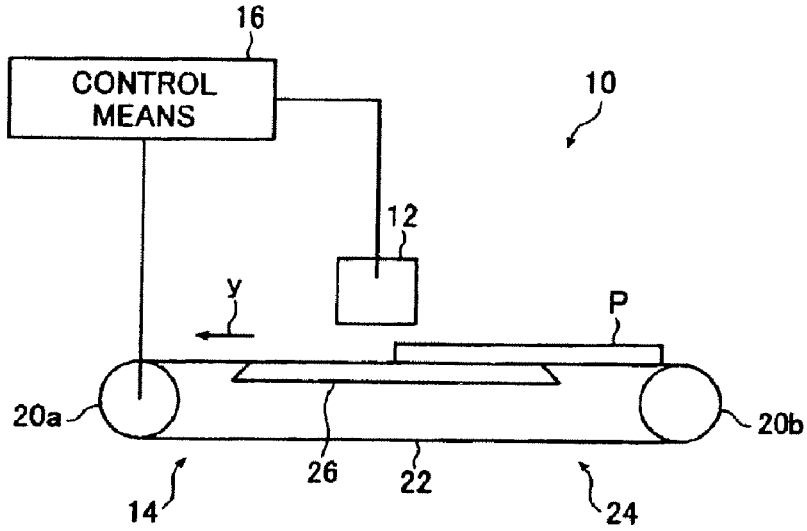
FIG. 1A shows in concept the overall configuration of an ink-jet printer as an example of the image forming apparatus of the invention.
Figure 1B:
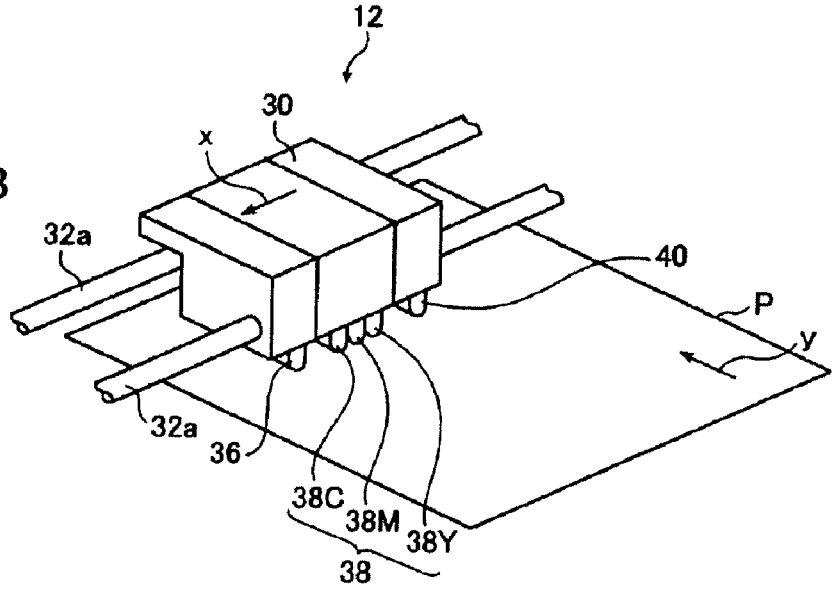
FIG. 1B is a perspective view showing the head section of the ink-jet printer depicted in FIG. 1A.

FIGS. 1A shows in concept the overall configuration of a printer 10 which is an example or the image forming apparatus of the invention. FIG. 1B is a schematic perspective view of a head section 12 of the printer 10.

The printer 10 adopts an ink-jet system to form an image with a three-dimensional effect on a recording medium (image-receiving medium) P and its basic components are a head section 12, a transport-for-scan means 14 and a control means 16.

In the present invention, the recording medium P is not limited to any particular type and a variety of materials including paper and plastic film can be employed as long as they are compatible with image recording by the head section 12.

The printer 10 may have various other components that constitute ink-jet printers such as the cleaning unit and cap unit associated with the ink-jet recording head, as well as an automatic paper feeder.

The control means 16 is a site that controls the overall operation of the printer 10 including, for example, the transport for scan of the recording medium P by the transport-for-scan means 14 which will be described later and the image formation (droplet ejection) in the head section 12. Having this capability, the control means 16 is typically composed of a CPU, etc.

The transport-for-scan means 14 transports the recording medium P for scan in a specified transport-for-scan direction. It comprises a belt conveyor 24 and an image forming bed 26. The belt conveyor 24 comprises two rollers 20 (20a and 20b), an endless belt 22 stretched between these two rollers 20, and a drive source (not shown). The image forming bed 26 is enclosed with the endless belt 22 such that it is urged against the ceiling of the endless belt 22 (the inner surface of its top side) to support the latter from below.

With the recording medium P resting on the endless belt 22, the transport-for-scan means 14 drives the belt conveyor 24 so that the recording medium P is transported for scan in the transport-for-scan direction (indicated by arrow y in FIG. 1A). The recording medium P is supported from below by means of the image forming bed 26 and it is kept an appropriate distance from the ink-jet recording head in the head section 12 (or head unit 30) to be described later.

As shown in FIG. 1B, the head section 12 comprises a head unit 30 having the ink-jet recording head, guide pipes 32 (32a and 32b), and a head unit moving means (not shown).

The guide pipes 32 are both positioned to extend in a direction that is perpendicular to the aforementioned transport-for-scan direction and which is hereunder referred to as a main scan direction (as indicated by arrow x in FIG. 1B and which, in FIG. 1A, is normal to the paper and runs closer to the viewer), The guide pipe 32a simply sits by the head unit 30 whereas the other guide pipe 32b passes through the head unit 30; both guide pipes 32 are engaged with the head unit 30 and hold it such that it is free to move in the main scan direction.

The illustrated printer 10 performs image formation with ink-jet recording heads of a so-called carriage type. The head unit 30 in the head section 12 has a plurality of ink-jet recording heads arranged in such a way that the row of nozzles on each head is in alignment with the transport-for-scan direction. During image formation, the head unit 30 moves in the main scan direction (performs main scan) from a specified scan (recording) start position to a specified scan end position, then returns from the scan end position to the scan start position, and repeats those movements. In this main scan mode, droplets are ejected from each ink-jet recording head as modulated in accordance with the image to be formed.

In cooperation with the head unit 30, the transport-for-scan means 14 operates in the same manner as in an ink-jet printer of the usual carriage type: while the head unit 30 is in the main scan mode (to form image), the transport-for-scan means 14 ceases the action of transport for scan and when the head unit 30 is returning from the scan end position to the scan start position, the transport-for-scan means 14 transports the recording medium P for scan by a specified length as appropriate for the length of the nozzle row and the like. By repeating these actions, the transport-for-scan means 14 transports the recording medium P for scan at intervals in synchronism with the image formation (scanning) by the head section 12.

The head unit 30 comprises three kinds of ink-jet recording head, the first ink jet recording head 36, the second ink-jet recording head 38 and the third ink-jet recording head 40 (these three kinds of ink-jet recording head are hereunder referred to simply as recording heads), as well as detachable/replaceable ink tanks that are filled with liquids that form the respective layers, and supply paths through which the liquids are supplied from the ink tanks to the corresponding recording heads; these and other components are integrated in a unitary form.

As already mentioned, the recording heads are so positioned that the row of nozzles (the arrangement of droplet ejecting nozzles) on each head is in alignment with the transport-for-scan direction (indicated by arrow y) and the first ink-jet recording head 36, the second ink-jet recording head 38 and the third ink-jet recording head 40 are arranged in the head unit 30 in that order as seen from the downstream side of the main scan direction (indicated by arrow x) which is perpendicular to the transport-for-scan direction.

The recording heads to be used in the image forming apparatus or the invention are preferably of a so-called piezoelectric type which employs a piezoelectric device to vibrate a diaphragm and eject droplets. However, this is not the sole example of the invention and various types of recording heads may be employed as long as they can eject the droplets that need to be forced out.

In the illustrated case, the three recording heads 36, 38 and 40 are of the piezoelectric type that ejects droplets of wax. An example of such recording heads is disclosed in JP 4-74193 B and records an image using ink of a solid type that melts upon heating.

Note that the present invention is by no means limited to the case where the three recording heads 36, 38 and 40 are of an identical type and various combinations are possible. For example, the second ink-jet recording head 38 may be of a thermal ink-jet type whereas the first and third recording heads 36 and 40 are of a piezoelectric type. Alternatively, the three recording heads may be of different types, i.e., a piezoelectric type, an electrostatic type and a thermal ink-jet type.

The first ink-jet recording head 36 (hereunder referred to simply as the first recording head 36) forms a first irregular layer 44 on the surface of the recording medium P.

The first irregular layer 44 has large undulations that are formed in accordance with the design of the original picture, say, the heights and positions of its constituent elements. The undulations in this first irregular layer 44 contribute to producing an image having a satisfactory three-dimensional effect.

Figure 2A:
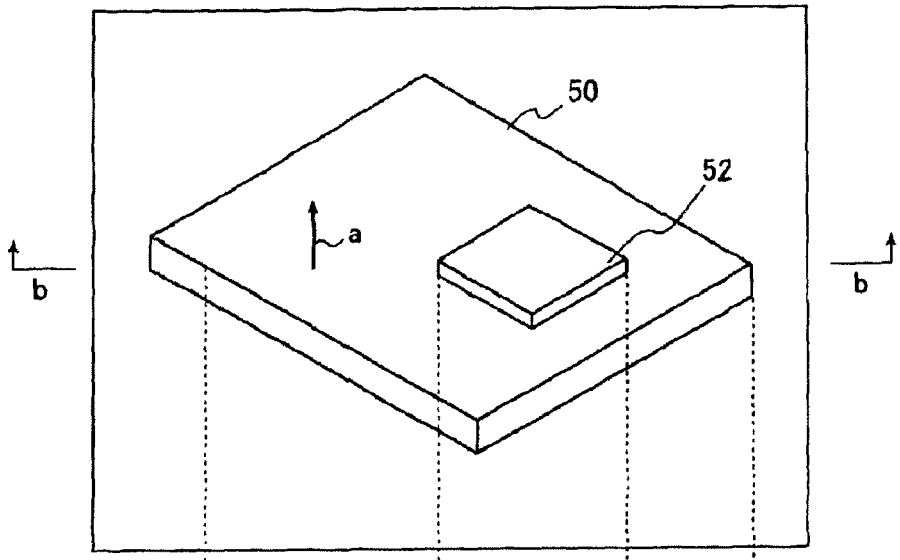
FIG. 2A shows in concept a print that can be produced with the image forming apparatus of the invention.

Consider, for example, an original picture which, as shown schematically in FIG. 2A, includes a base 50 that carries an object 52 in the form of a rectangular prism. In this case, the first irregular layer 44 may have such steps as shown diagrammatically in FIG. 2B which is section b-b of FIG. 2A, where the area of the object 52 is the highest, the area of the base 50 is the second highest and the background area is the lowest. In accordance with this order of height, the first recording head 36 modulates the ejection of droplets from each nozzle to form the first irregular layer 44.

Alternatively, if the original picture includes a wavy constituent element such as a towel lying on a table, the first recording head 36 may form the first irregular layer 44 by modulating the ejection of droplets from each nozzle such that the area of interest will have undulations that reflect the wavy surface of the towel.

Figure 2B:
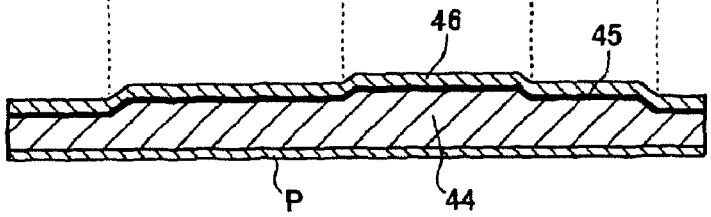
FIG. 2B is section b-b of FIG. 2A.

In the present invention, the first irregular layer 44 may be formed over the entire surface of the recording medium P as shown in FIG. 2B. Alternatively, the first irregular layer 44 may be formed on at least a part of the surface of the recording medium P in accordance with the design of the original picture or its constituent elements; for instance, it may be formed for the constituent element that is located in the highest position (like the object 52 in FIG. 2A) or the constituent element that is located the closest to the viewer; in other cases, the first irregular layer 44 may not be formed in the lowest area of the original picture (like the background in FIG. 2A) or the area that is the remotest from the viewer.

For high-speed formation of a layer having large undulations, the first recording head 36 preferably ejects droplets that are large in diameter and have a certain degree of viscosity. A specifically preferred recording head ensures that a liquid, especially a resin liquid, having a viscosity of 1 mPa·s to 30 mPa·s within the head is ejected as droplets in a volume of 50 pl (picoliters) to 200 pl.

The difference between undulations on the first irregular layer 44 to be formed by the first recording head 36 (i.e. the difference in height between a peak and a bottom) is not limited to any particular value. However, in the illustrated case where image recording is effected on top of the first irregular layer 44, an increase in the gap between the recording head and the recording medium P will cause adverse effects on the precision of image recording and the like; therefore, the difference between undulations is preferably set not to exceed 2 mm. There is also no particular limitation on the thickness of the first irregular surface 44 and it can be determined as appropriate for various factors including the material of the recording medium P, the size of a hard copy and its use.

The image forming apparatus of the present invention is preferably so designed that the gap between the recording head and the image forming bed 26 can be adjusted by choosing a suitable value for the thickness of the recording medium P so that the distance between the recording head and the top surface of the recording medium P is kept substantially constant irrespective of the thickness of the recording medium P.

The material that forms the first irregular layer 44 is not limited in any particular way and a suitable one may be chosen from those which satisfy the aforementioned conditions on viscosity and the difference between undulations.

For example, varieties or waxes and thermoplastic resins may be employed; exemplary thermoplastic resins are adipate-based esters and high-molecular weight polystyrenes. Alternatively, photocurable resins may be employed. When using photocurable resins, a means for applying energy radiation in order to cure such resins is preferably mounted on the head unit 30.

In order that it will not interfere with the viewing of an image, the first irregular layer 44 is preferably colorless and transparent or white in color. If desired, it may assume an achromatic color of low density. However, if the first irregular layer 44 lies over the image, it should be colorless and transparent unless there is a special circumstance such as the need to provide a color tint over the entire surface.

The second ink-jet recording head 38 (hereunder referred to simply as the second recording head 38) records an image over the first irregular layer 44 formed by the first recording head 36. The constitution of a print (hard copy) made by the invention is depicted in FIG. 2B where the image is indicated by an image layer 45 for convenience sake.

The second recording head 39 may be of a known type that performs conventional color or monochromatic image recording. In the illustrated case, the second recording head 38 consists of three sub-heads 38C, 38M and 38Y that eject C (cyan) ink, M (magenta) ink and Y (yellow) ink, respectively, to record a full-color image.

The ink to be used in image recording with the second recording head 38 is not limited to any particular type and an appropriate one may be chosen from among those inks which can record image on the surface where image recording is to be done (i.e. the first irregular layer 44 in the illustrated case).

In the illustrated case, if the first irregular layer 44 is formed of wax, ink of a similar wax type or ink of a thermoplastic resin type that adheres to wax may be employed. If this is the case, the second recording head 38 is preferably of the illustrated piezoelectric type that can eject resin droplets. If the surface where image recording is to be done by means of the second recording head 38 is hydrophilic, the most commonly used thermal ink-jet head that ejects an aqueous ink to record image can also be used with advantage.

The printer 10 may be so designed that the position of the second recording head 38 (i.e. the gap between the ink ejecting face and the endless belt 22) can be controlled by adjusting the thickness of the previously formed first irregular layer 44.

The third ink-jet recording head 40 (hereunder referred to simply as the third recording head 40) forms a second irregular layer 46 over the image (image layer 45) formed by means of the second recording head 38.

The second irregular layer 46 has fine undulations that represent the texture of the design of the original picture, for example, its constituent elements in accordance with their surface characteristics.

Consider again the original picture shown in FIG. 2A. If the base 50 is made of wood and the object 52 a metal, the latter has gloss whereas the former has low gloss.

In accordance with these surface characteristics, the third recording head 40 forms the second irregular layer 46 by modulating the ejection of droplets from each nozzle such that no undulations are formed in the area of the object 52 whereas fine undulations are formed in the area of the base 50. As a result, the object 52 is given gloss but the base 50 which should have a matte surface is given no gloss, whereby the texture of objects that make up the original picture can be expressed in an effective way.

If desired, depending on the material of a constituent element of the original picture such as a fabric, a metal, a resin or wood, the state of undulations as exemplified by the difference in their height (maximum height, Rz, or arithmetic average roughness, Ra), the frequency at which high and low spots are formed, the density of their formation, their aggregation pattern and the thickness of the second irregular layer 46 may be preliminarily determined and, in accordance with the thus determined parameters, the third recording head 40 may modulate the ejection of droplets from each nozzle such that the undulations in the second irregular layer 46 are adjusted to represent the texture of a particular constituent element of the original picture.

In the case of a metallic material, its texture can be effectively represented by forming the second irregular layer 46 such that Rz is 0-5 μm and the period of high spots of the undulations is 100-200 μm. In the case of a resinous material, its texture can be effectively represented by forming the second irregular layer 46 such that Rz is 0-2 μm and the period of high spots of the undulations is 50-200 μm. In the case of a fabric material, its texture can be effectively represented by forming the second irregular layer 46 such that Rz is 8-12 μm and the period of high spots of the undulations is 300-400 μm. In the case of a woody material, its texture can be effectively represented by forming the second irregular layer 46 such that Rz is 10-15 μm and the period of nigh spots of the undulations is 200-400 μm.

If desired, in accordance with the three-dimensional positions of constituent elements of the original picture, each nozzle on the third recording head 40 may be so modulated that the degree of undulations on the second irregular layer 46 is adjusted to accentuate the depth of the image.

Take, for example, the surface of the base 50. Its distance from the viewer increases in the direction in which arrow a goes farther up in FIG. 2A. In accordance with this surface characteristic of the base 50, the second irregular layer 46 is provided with large undulations in that area of the base 50 which is closer to the viewer and the intensity of the undulations is gradually reduced as the distance from the viewer increases. Alternatively, if the original picture has two non-glossy constituent elements at different positions, one being closer to the viewer and the other remote from the viewer, the second irregular layer 46 is provided with larger undulations in the area of the element which is closer to the viewer than in the area of the other element. The intensity of undulations is reversed in the case of two glossy constituent elements.

Thus, by forming undulations on the second irregular layer 46 in the corresponding areas of a constituent element of the original picture such that the surface characteristic of the area that is closer to the viewer is accentuated but the surface characteristic of the area that is away from the viewer is blurred, the distance of the constituent element from the viewer and its position can be sufficiently stressed to provide better texture.

Further speaking of the base 50, it has edges (angular portions) and by providing more or less large undulations in the neighborhood of each edge (excepting the edge itself) or by changing the state of undulations on the two adjoining sides that form an edge, the edge may be enhanced to effectively represent the texture of the constituent element.

In the second irregular layer 46, the intensity of the undulations to be formed can be controlled by adjusting one or more of the following exemplary parameters: the difference in height between undulations (Ra and Rz); the frequency of undulations; the density of undulations; the aggregation pattern of undulations; and the thickness of the second irregular layer 46. The difference in height between undulations may be defined as the height of a high spot compared to that of a low spot or the maximum height of undulations; the frequency of undulations may be defined as the period at which high and low spots are alternately formed; the density of undulations may be defined as the number of high and low spots in a unit area; the aggregation pattern of undulations may be defined as a two-dimensional formation pattern of high and low spots; the thickness of the second irregular layer 46 may be defined as the thickness of the thinnest portion of that layer.

If the difference in height between undulations on the second irregular layer 46 is small, a glossy texture is provided and as the difference increases, a matte texture is obtained. Therefore, if a glossy surface is located closer to the viewer, the difference in height between undulations is preferably reduced to emphasize its gloss as already mentioned above. Conversely, if a non-glossy surface is located closer to the viewer, the difference in height between undulations is preferably increased to emphasize its non-glossiness. Let assume a surface which is oriented as indicated by arrow a in FIG. 2A. In this case, the difference in height between undulations is made small in the area closer to the viewer but progressively increased as the distance from the viewer increases.

Further in addition, the frequency of undulations may be changed as appropriate to enable more effective representation. For example, if one wants to represent a strong matte texture, the period of alternating undulations is shortened and if one wants to represent a weak matte texture, the period is increased, thereby ensuring that varying matte textures can be expressed in a more advantageous way.

The second irregular layer 46 may be formed to cover the entire surface of the recording medium P (image). Alternatively, it may be formed on at least a portion of the image, such as being formed in only the area of a suitably chosen constituent element, say, the area of the base 50 (see FIG. 2A). Furthermore, the second irregular layer 46 itself need not be continuous over the entire part of the area where it is to be formed and the underlying surface such as the image recording surface may be partly exposed. If desired, a large number of independent high spots may be formed to produce undulations.

In order to form a layer having fine undulations, the third recording head 40 for use in forming the second irregular layer 46 preferably ejects droplets that have a certain degree of viscosity and are small in diameter. A specifically preferred recording head ensures that a liquid, especially a resin liquid, having a viscosity of 1 mPa·s to 30 mPa·s within the head is ejected as droplets in a volume of 5 pl to 80 pl.

The second irregular layer 46 to be formed by the third recording head 40 is not limited in any particular way but preferably its Ra (arithmetic average roughness) lies between 1 μm and 20 μm, more preferably between 2 μm and 10 μm, and its Rz (maximum height of high spots) preferably lies between 5 μm and 50 μm, more preferably between 8 μm and 35 μm.

The material of the second irregular layer 46 is not limited to any particular type, either, and a suitable one may be chosen as appropriate. However, a certain degree of viscosity is required to form fine undulations and, hence, varieties of waxes and thermoplastic resins (e.g. adipate-based esters and high-molecular weight polystyrenes) may be employed. Alternatively, photocurable resins may be employed. When using photocurable resins, a means for applying energy radiation in order to cure such resins is preferably mounted on the head unit 30 as in the aforementioned case of forming the first irregular layer 44.

If the second irregular layer 46 is to be formed over the image, it should be colorless and transparent unless there is a special circumstance such as the need to provide a color tint over the entire surface. If the second irregular layer 46 is to be formed under the image, it is preferably colorless and transparent or white in color in order that it will not interfere with the viewing of the image.

Considering those points, like the first and second recording heads, the third recording head 40 is preferably of the illustrated piezoelectric type which can eject resin droplets.

In order to form an image on the recording medium P, the head unit 30 makes movements in the manner already described above, i.e., it moves in the main scan direction (indicated by arrow x) from a specified scan start position and when the main scan ends, it moves in reverse direction, returning to the scan start position, and repeats those movements. As also mentioned above, during image formation, the transport-for-scan means 14 transports the recording medium P for scan in the transport-for-scan direction (indicated by arrow y) which is perpendicular to the main scan direction and at intervals in synchronism with the main scanning operation of the head unit 30. Image formation by the head unit 30 and transport for scan of the recording medium P by the transport-for-scan means 14 are controlled by the control means 16 and this has already been discussed above.

As already mentioned, in the illustrated case, the first inklet recording head 36, the second ink jet recording head 38 and the third ink-jet recording head 40 are arranged in the head unit 30 in that order as seen from the downstream side of the main scan direction; during main scan, each recording head ejects droplets from the respective nozzles as they are modulated in accordance with the undulations on the layer to be formed and the intended image.

Therefore, in the main scan made, formation of the first irregular layer 44, image recording and formation of the second irregular layer 46 are sequentially effected on the recording medium P by means of the head unit 30 (consisting of the first recording head 36, the second recording head 38 and the third recording head 40) and, in addition, transport for scan is performed to ensure that the whole surface of the recording medium P is scanned with the head unit 30 to form the intended image.

Thus, the image forming apparatus of the present invention employs three types of recording head that satisfy different requirements, i.e., the first recording head 36 which forms the first irregular layer 44 that has large enough undulations to represent the three-dimensional effect of the real world, the second recording head 38 which performs image recording, and the third recording head 40 which forms the second irregular layer 46 having fine enough undulations to represent the texture of constituent elements in the original picture; as a result, hard copies of high quality that represent not only the three-dimensional effect of the real world by large undulations but also the texture of constituent elements in the original picture by fine undulations can be produced with high efficiency and rapidity.

While the image forming apparatus of the invention has been described in detail, it should be noted that the invention is by no means limited to the foregoing embodiments and various improvements and modifications are possible without departing from the scope and spirit of the invention.

For example, the illustrated printer 10 forms the first irregular layer having large undulations before it records an image over that layer and covers the image layer with the second irregular layer having fine undulations. This is not the sole case of the invention and an image may be first recorded on the recording medium P, then overlaid with the first irregular layer which in turn is overlaid with the second irregular layer Alternatively, the first irregular layer may be formed on the recording medium P, then overlaid with the second irregular layer, on which is then recorded an image. In short, the layer arrangement that can be adopted in the present invention is not limited in any particular way as long as the second irregular layer having fine undulations is formed on top of the first irregular layer having large undulations.

For instance, the embodiment where image recording is first effected on the recording medium P is somewhat disadvantageous from the viewpoint of providing a satisfactory three-dimensional effect but it is advantageous from other viewpoints including the precision of image recording, the latitude in selection of image recording ink, and the latitude in selection of the recording heads. Therefore, one may choose a suitable layer arrangement depending on the characteristics required of the image forming apparatus.

In addition, the illustrated printer 10 is an ink-jet printer of a so-called carriage type which employs a serial head in which recording heads perform main scan in a direction perpendicular to the nozzle row, with the recording medium P being transported at intervals in a direction perpendicular to the main scan direction. This is not the sole case of the invention and an ink-jet printer of a so-called line head type may be substituted. In this alternative case, a so-called line head having nozzle rows that extend across the recording medium P is employed and the recording medium P is continuously transported for scan in a direction perpendicular to the nozzle rows, whereby the whole surface of the recording medium P is scanned with the recording heads.

As described in detail on the foregoing pages, by means of the image forming apparatus of the invention relying on inkjet image recording, there can be formed hard copies of high quality that not only represent the three-dimensional effect of the reel world by forming large undulations in accordance with the design of the original picture but also reproduce faithfully its texture such as the gloss or non-glossiness of its constituent elements by forming fine undulations, with the added advantage that this can be realized with high efficiency and rapidity.

What is claimed is:

1. An image forming apparatus comprising:

a first ink-jet recording head which forms a first layer having first undulations in accordance with an image to be recorded;

a second ink-jet recording head which performs image recording; and a third ink-jet recording head which forms a second layer having second undulations that are also in accordance with said image to be recorded [but larger] *and smaller* than said first undulations of said first layer that is to be formed by said first [ink-let] *ink-jet* recording head.

2. The image forming apparatus according to claim 1, wherein said first ink-jet recording head is such that a liquid resin having a viscosity of 1 mPa·s to 30 mPa·s within said first ink-jet recording head is ejected as droplets in a volume of 50 pl to 200 pl by said first ink-jet recording head, and said third ink-jet recording head is such that a liquid resin having a viscosity of 1 mPa·s to 30 mPa·s within said third ink-jet recording head is ejected as droplets in a volume of 5 pl to 80 pl by said third ink-jet recording head.

3. The image forming apparatus according to claim 2, wherein said first ink-jet recording head forms said first layer in which differences among undulations are no more than 2 mm and said third ink-jet recording head forms said second layer in which differences among undulations are no more than 100 μm.

4. The image forming apparatus according to claim 1, wherein said first ink-jet recording head forms said first layer in which differences among undulations are no more than 2 mm and said third ink-jet recording head forms said second layer in which differences among undulations are no more than 100 μm.

* * * * *